(12) United States Patent
Revis

(10) Patent No.: US 6,285,354 B1
(45) Date of Patent: Sep. 4, 2001

(54) COMBINATION MOUSE AND TELEPHONE HANDSET

(75) Inventor: Paul A. Revis, Meridian, ID (US)

(73) Assignee: Micron Technology, Inc., Nampa, ID (US)

( * ) Notice: Subject to any disclaimer, the term of this patent is extended or adjusted under 35 U.S.C. 154(b) by 0 days.

(21) Appl. No.: 09/203,173

(22) Filed: Nov. 30, 1998

(51) Int. Cl.⁷ ........................................................ G09G 5/08
(52) U.S. Cl. ............................................ 345/163; 379/433
(58) Field of Search ............................... 345/163, 168, 345/169, 172, 173, 157; 379/419, 433

(56) References Cited

U.S. PATENT DOCUMENTS

| | | |
|---|---|---|
| D. 320,197 | 9/1991 | Weber . |
| 4,917,516 * | 4/1990 | Retter ................................. 340/710 |
| 5,063,376 | 11/1991 | Chang . |
| 5,457,480 | 10/1995 | White . |
| 5,631,669 * | 5/1997 | Stobbs et al. .......................... 345/163 |
| 5,659,335 | 8/1997 | Partridge, III . |
| 5,706,031 * | 1/1998 | Brendzel et al. ...................... 345/172 |
| 5,847,695 * | 12/1998 | Duncan et al. ........................ 345/163 |
| 6,040,820 * | 3/2000 | Choi ..................................... 345/163 |

* cited by examiner

*Primary Examiner*—Richard Hjerpe
*Assistant Examiner*—Ronald Laneau
(74) *Attorney, Agent, or Firm*—Perkins Coie LLP

(57) ABSTRACT

A combined computer mouse and telephone device is provided. The device includes a common housing which can open to provide a telephone handset, and close to provide a computer mouse. The device is toggled between a mouse and telephone mode of operation via a hinge-switch which switches upon opening and closing of the housing. The telephone keypad is located on an interior of the housing during operation of the mouse, thereby eliminating the possibility of accidentally depressing the keypad when using the mouse.

51 Claims, 5 Drawing Sheets

COMBINATION MOUSE AND TELEPHONE HANDSET

BACKGROUND OF THE INVENTION

1. Field of the Invention

The present invention relates generally to computer interface devices and telecommunications; more specifically, the present invention relates to the combination of a computer mouse and telephone.

2. Description of the Related Art

Computers and telephones are indispensable tools for efficiently performing work in the modern workplace. Very often, both are found in close proximity to one another, whether that workplace be the office or the home. Furthermore, virtually every personal computer is accompanied by a mouse to facilitate computer input.

Since the mouse and the telephone are often located on the same finite workspace, they tend to significantly add to workspace clutter. U.S. Pat. No. 5,706,031, entitled "Computing and Telecommunications Interface System", discloses a partial solution to this problem by providing a mouse and a telephone integrated into a single device. Unfortunately, the device cannot be used as a telephone unless the computer is powered-up. Additionally, the telephone data entry keypad is located on the top side of the mouse, thereby interfering with the user's operation of the mouse.

Another problem associated with the combined mouse/telephone disclosed in the '031 patent is that the user has no simple way of knowing which mode of operation the device is in. That is to say, the device operates in either mode, as a mouse or a telephone, without changing its appearance.

SUMMARY OF THE INVENTION

The present invention provides a device which integrates the functions of a mouse and telephone handset in a manner which provides a device which is easy to use and which does not require that the computer be turned on for use of the telephone function.

In addition, the device may be used as either a mouse or a telephone, and the user can easily identify which mode of operation the device is in. The device is in an open configuration for use as a telephone, and in a closed configuration, for use as a mouse. A switch, activated by opening or closing the device, automatically selects the appropriate mode of operation for the device.

In addition, accidental operation of the keypad when the device is functioning as a mouse is avoided by placing the keypad beneath a top-side housing of the device so that it is not exposed for accidental operation.

BRIEF DESCRIPTION OF THE DRAWINGS

These and other advantages and features of the invention will be more clearly understood from the following detailed description of the invention which is provided in connection with the accompanying drawings in which.

DETAILED DESCRIPTION OF PREFERRED EMBODIMENT

A preferred embodiment of the present invention will now be described with reference to FIGS. 1–5. Other embodiments may be realized and structural, or logical changes may be made to the disclosed embodiment without departing from the spirit or scope of the present invention.

Figure 1:
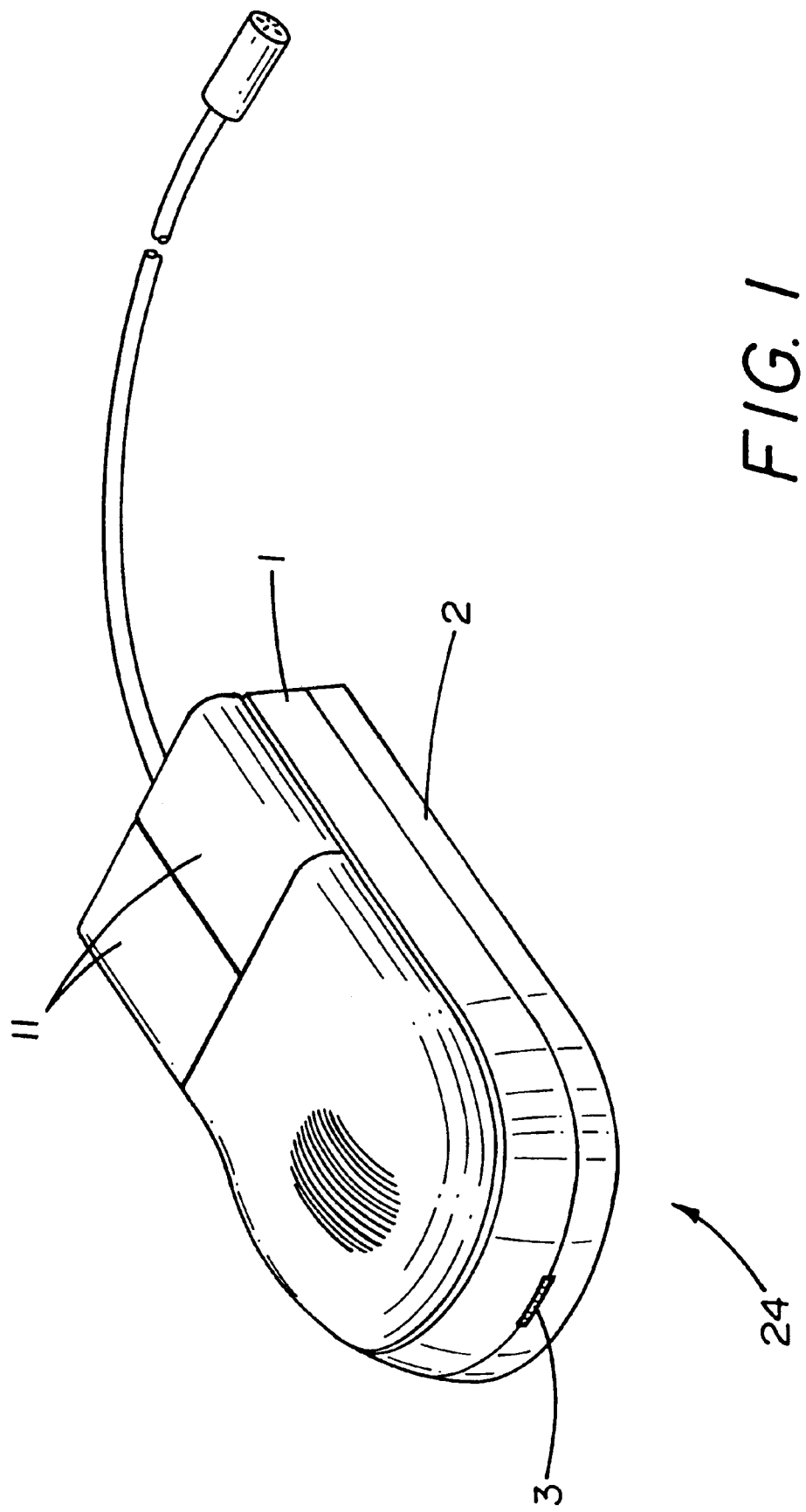
FIG. 1 illustrates a combined mouse/telephone device with a handset in a closed condition.
Figure 2:
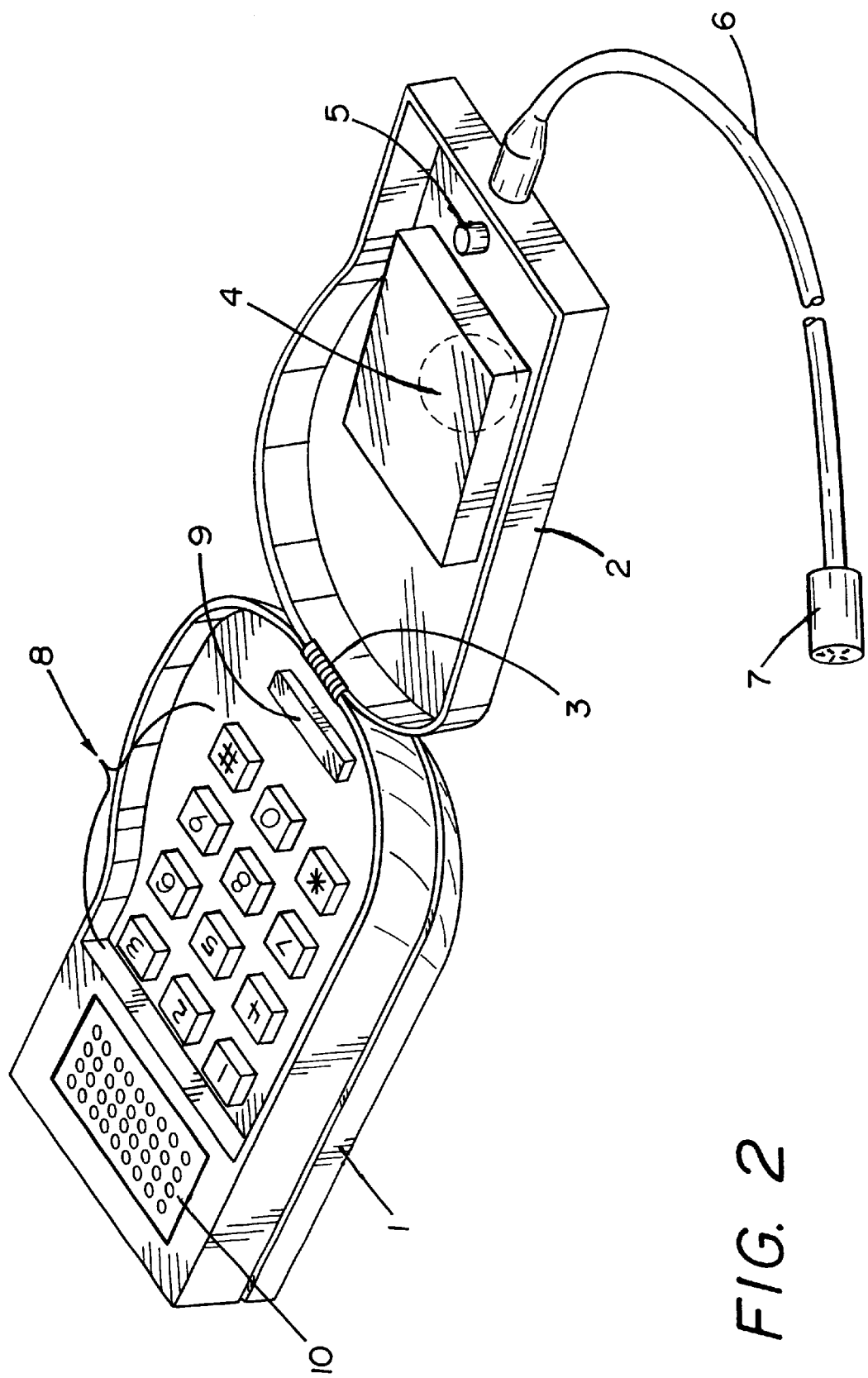
FIG. 2 illustrates the combined mouse/telephone device with a handset in an open condition.

FIGS. 1 and 2 illustrate the closed and open conditions, respectively, of a combined mouse/telephone device 24 in accordance with a preferred embodiment of the invention. While in the FIG. 1 closed condition, the device operates as a computer mouse. The device 24 has a common housing formed by a top-side housing portion 1 and a bottom-side housing portion 2 which are hinged together by hinge 3. While the device 24 is in the closed condition, the top-side housing portion 1 and the bottom-side housing portion 2 are in face-to-face contact; thereby enabling use of the device as a mouse. As discussed below, device 24 functions as a telephone when the common housing is opened by relative rotation of the top-side and bottom-side housing portions 1, 2 about hinge 3.

An exterior surface of the top-side housing 1 contains a plurality of conventional mouse pointer select buttons 11. The circuitry associated with the pointer select buttons 11 is well known in the art and may be located anywhere within the device 24. It should be understood that while two pointer select buttons 11 are illustrated in the preferred embodiment of the invention, device 24 may contain any number of pointer select buttons 11. In addition, while the pointer select buttons 11 are shown as residing on one end (the right end in FIG. 1) of the top of device 24, this location is not critical and the pointer select buttons 11 may be located elsewhere on the external top or sides of device 24. As noted, the top-side housing portion and bottom-side housing portion are interconnected by a hinge 3 which permits the device 24 to open and close as shown in FIGS. 1 and 2. The hinge 3 may be located at alternate locations around the periphery of the top-side housing 1 and bottom-side housing 2, however, it is recommended to be in the left-side location, as depicted in FIG. 1, for optimum use of device 24 as a flip-phone style telephone handset.

With reference to FIG. 2, top-side housing 1 contains a speaker 10, which is concealed when the device 24 is in a closed condition. The speaker 10 is used as an output device for the flip-phone style telephone handset operation while the device is in the open condition. The telephone circuitry, which is well known in the art, is preferably contained within the top-side housing 1. The telephone microphone 5 is provided on the inside of the bottom-side housing 2. Speaker 10 and microphone 5 may be located at other positions on the device 24, however, it is recommended that the speaker 10 and microphone 5 be located in the approximate position as depicted in FIG. 2 so as to allow the user to operate the device 24 as a flip-phone style handset. In addition, the telephone circuitry may also be located anywhere within the top-side housing 1 and bottom-side housing 2 of device 24.

Top-side housing 1 also contains an alphanumeric data entry telephone keypad 8, and its associated circuitry. The keypad 8 operates as an input device to the telephone when the device is in the open condition. As shown in FIG. 2, the keypad 8 is located on the underside of the top-side housing 1, however, it may be located in any other location where it will not interfere with the use of the device 24 as a computer mouse while in the FIG. 1 closed condition. The keypad 8 may be numbered in any particular order, however, it is desirable to have it numbered similarly to that of a standard telephone. The keys of the keypad 8 are depressed when the user desires to operate the device as a telephone and enter a number or letter or a series of numbers or letters.

The mouse mode of operation occurs when device 24 is in the FIG. 1 closed condition. The telephone mode of operation occurs when device 24 is in the FIG. 2 open condition. A switch built into hinge 3 controls the mode as will be described below.

Referring to FIG. 2, the top-side housing 1 also contains a depressible on hook/off-hook switch 9. The on-hook/off-hook switch 9 is accompanied by its associated circuitry which is well known in the art. As shown in FIG. 2, the on hook/off-hook switch 9 is located on the underside of the top-side housing 1, however, it may be located elsewhere on the device 24 where it would not interfere with the use of the device 24 as a mouse when in the FIG. 1 closed condition. The on-hook/off-hook switch 9 enables the user to switch between modes of operation while the device 24 is in the FIG. 2 open condition and being operated as a telephone. Thus, when the operator opens device 24 and separates the top-side housing 1 from the bottom-side housing 2, the hinge-switch selects a telephone mode, and the telephone operation is automatically engaged with the telephone automatically going off-hook, and device 24 is able to make and receive telephone calls. If during the use of the telephone, additional hook switch operations are required, they can be performed with the on-hook/off-hook switch 9. When the user wishes to end the communication, the on-hook/off-hook switch 9 may be depressed, or the user may simply return the device 24 to the FIG. 1 closed condition to place the telephone on-hook and resume operation of the device as a mouse.

The bottom-side housing 2 also contains a conventional mouse track ball 4 which protrudes beyond the underside of the bottom-side housing 2. Further details of the conventional mouse track ball 4 are described below in connection with FIG. 3.

The bottom-side housing 2 also contains a cord 6 attached on one end to the device 24. The opposite side of cord 6 is attached to an input/output (I/O) connector 7 which connects to an I/O connector provided at a computer. The cord 6 contains the usual mouse wires and also conventional telephone connection wires. The gender of connector 7 may be male or female, or a combination thereof Connector 7 is suitable for use in a standard I/O port. While FIG. 2 depicts the cord 6 as being connected to the bottom-side housing 2, it may be connected to device 24 at any other acceptable location. In addition, although one cord 6 is shown which contains the electrical wires for both a computer mouse and telephone, it is also possible to provide separate cords, one for the mouse wiring, and one for the telephone line. The portions of the telephone circuitry which are contained in topside housing 1 are electrically connected to the portions of the telephone circuitry in the bottom-side housing 2 through electrical connections provided at hinge 3.

Figure 3:
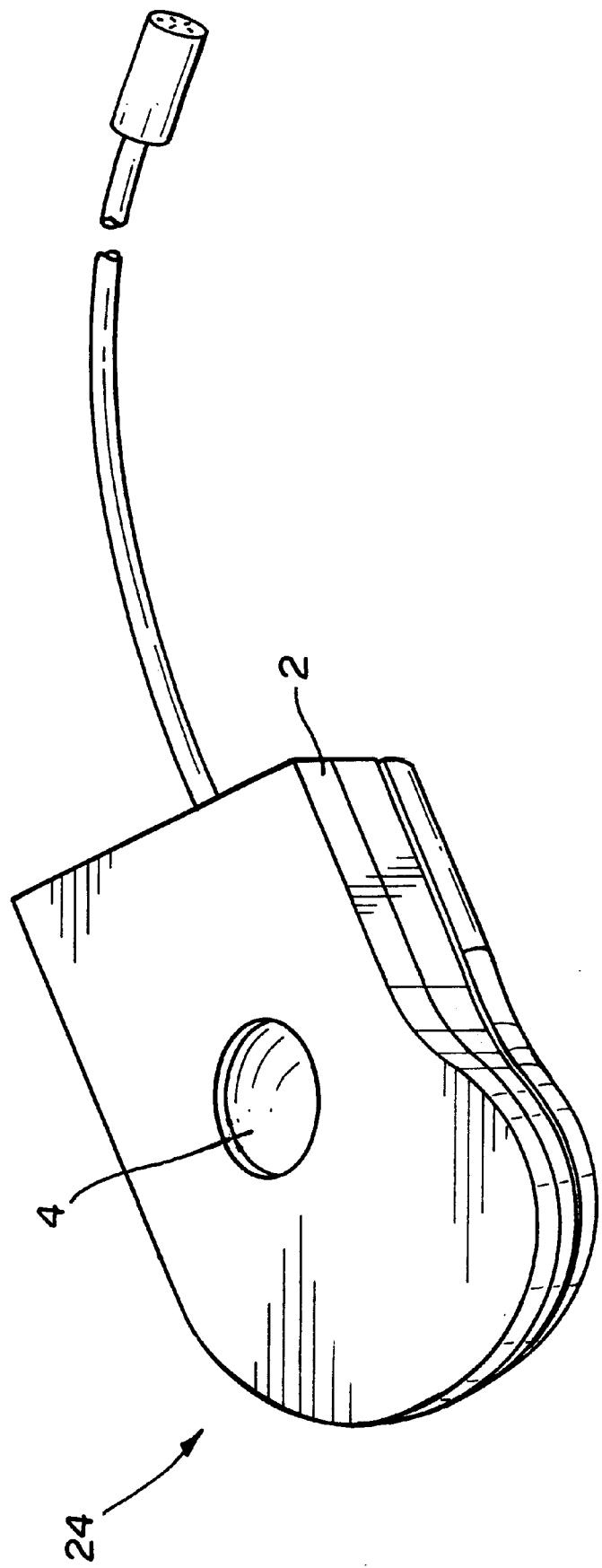
FIG. 3 illustrates a conventional mouse track ball located on an underside of the combined mouse/telephone device with a handset in a closed condition.

Referring now to FIG. 3, the bottom-side housing 2 of the device 24 is shown. The conventional mouse track ball 4 (as in FIG. 2) is depicted in a central position within the bottom-side housing 2 of the device 24. The conventional mouse track ball 4 is also depicted as protruding beyond the surface of the bottom-side housing 2. The mouse track ball 4 is accompanied by its associated position detection circuitry, which is well known in the art, and which senses the movement of the device 24 while it is being used as a mouse, as in FIG. 1.

Figure 4:
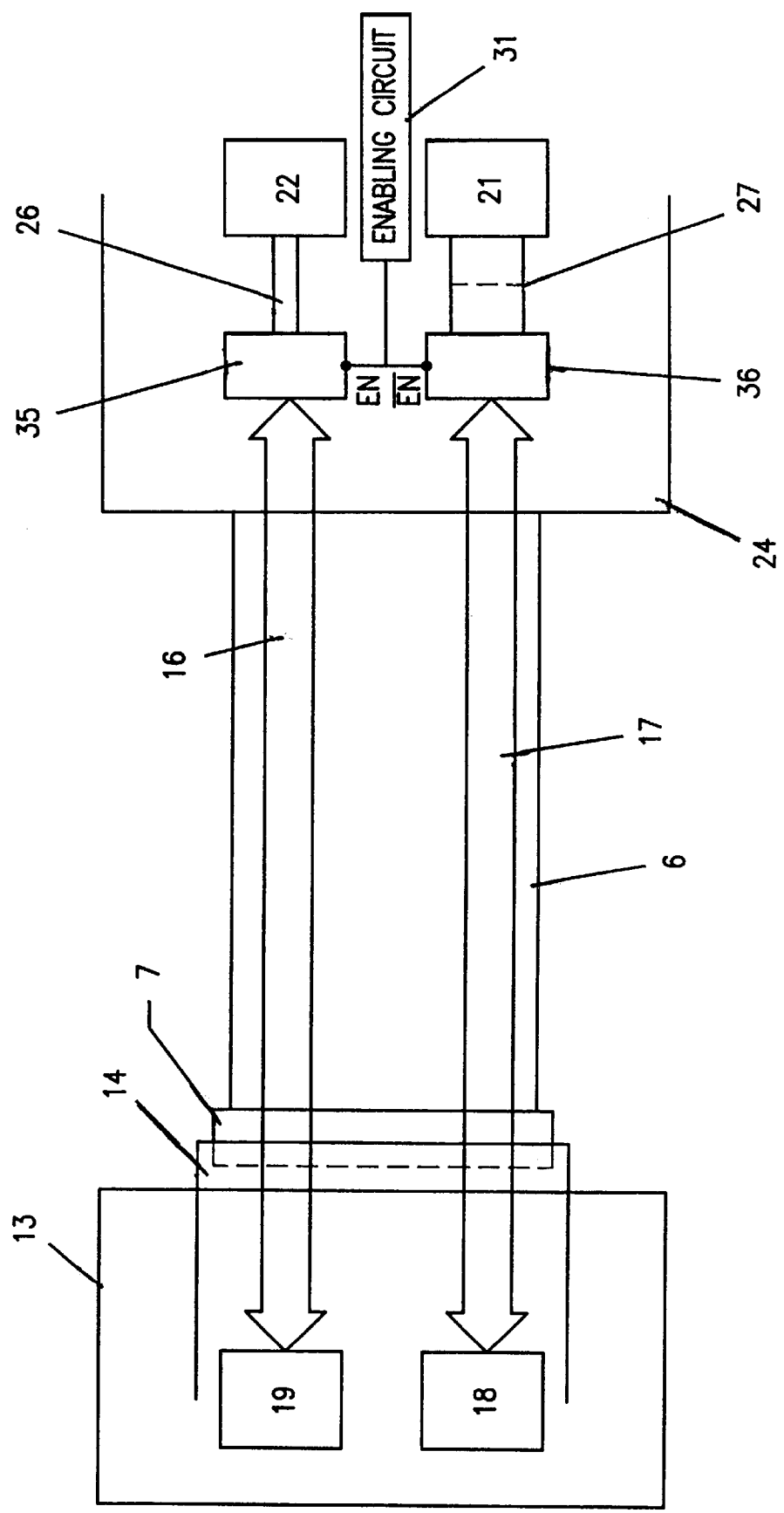
FIG. 4 illustrates a computer interface for the combined mouse/telephone device.

Referring now to FIG. 4, the combined mouse/telephone device 24 and a computer 13 are depicted. Also illustrated is a system for communicating between the computer 13 and the device 24 for both mouse and telephone modes. Electronic switches 35 and 36, located within the device 24, are used to connect the mouse circuitry 21 or the telephone circuitry 22 to its associated wiring, respectively, within cord 6. Wiring 16 will exist between the telephone circuitry 22 and the computer 13 when switch 35 is in an enabled condition and switch 36 is not enabled. Conversely, when switch 36 is enabled and switch 35 is not enabled, a connection will exist between mouse wiring 17 and the mouse circuitry 21. The telephone wires 16 may be similar to that of a standard telephone, and the mouse wires 17 may be similar to that of a conventional computer mouse. Although depicted at device 24, switches 35 and 36 may also be located within or on the computer 13, or any other location where they will serve the same purpose of toggling between the mouse and telephone functions. Switches 35 and 36 are controlled by an output signal from an enabling circuit 31 which is responsive to the hinge 3 switch which toggles upon opening or closing of the device 24. Thus, when device 24 is opened (as in FIG. 2), switch 35 is enabled, and when device 24 is closed (as in FIG. 1), switch 36 is enabled.

The I/O connector 7 of cord 6 connects with a complementary connector 14 of computer 13; thereby connecting the set of telephone wires 16 contained within cord 6 with conventional telephone hardware 19 contained within computer 13. In an embodiment of the invention, the set of telephone wires 16 may simply be connected with a telephone wall jack. In another embodiment, the set of telephone wires 16 may be connected with conventional telephone hardware 19, the hardware 19 being connected with a telephone wall jack. Connectors 7 and 14 also connect the conventional mouse wires 17 within cord 6 with a mouse input port 18 located within computer 13.

Figure 5:
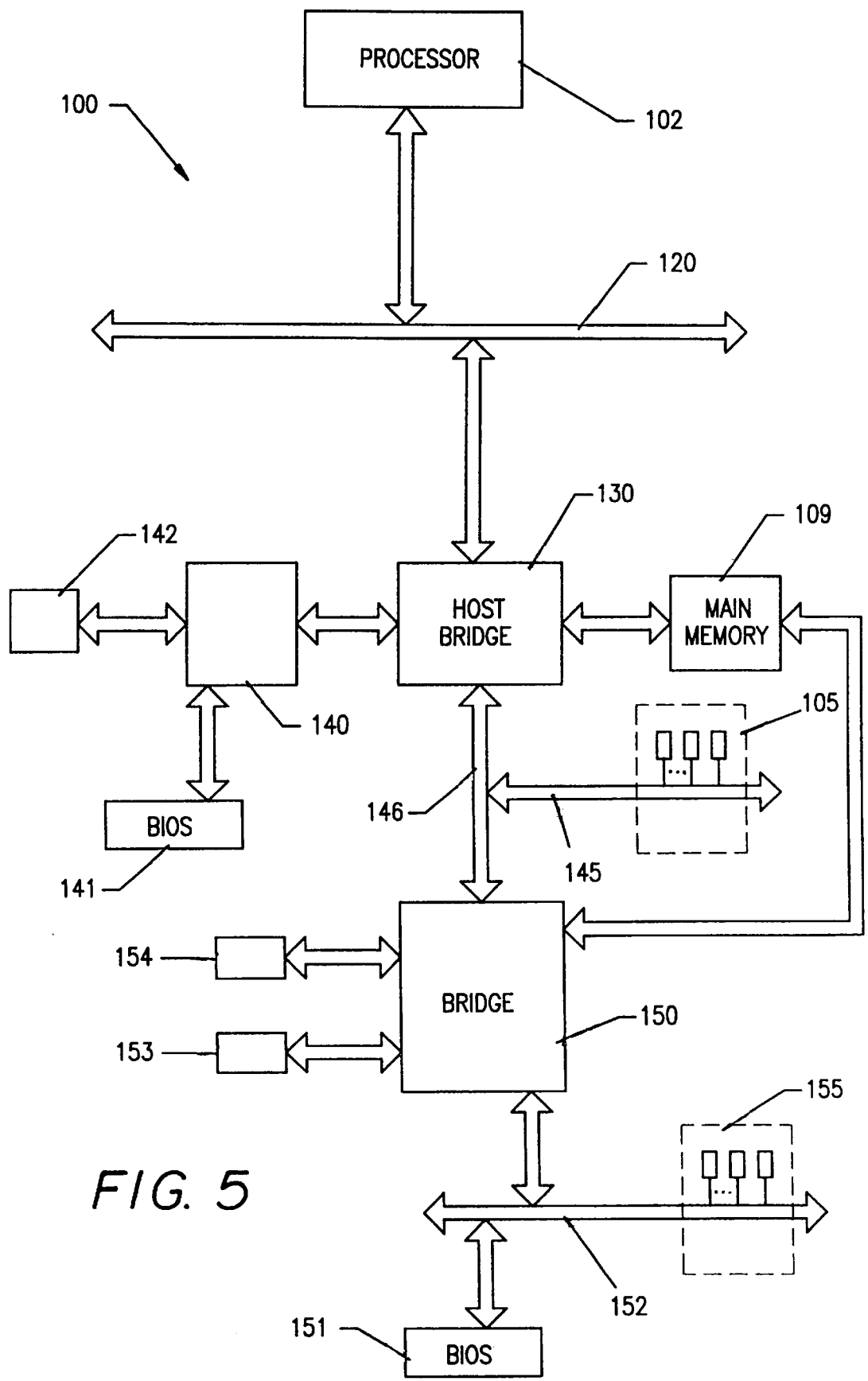
FIG. 5 illustrates a processor-based system which incorporates the combined mouse/telephone device.

FIG. 5 illustrates a processor-based system 100 of conventional architecture including a processor 102 coupled to a host bus 120. The host bus 120 may be coupled to a host bridge 130. The host bridge 130 couples the processor 102 to a graphics device bridge 140, wherein, the graphics device bridge 140 operates under a conventional video BIOS 141 and may also be coupled to an I/O device such as a conventional computer monitor 142.

The host bridge 130 also couples the processor 102 to a main memory 109. The main memory 109 may also be coupled to a third bridge 150. The host bridge 130 is also coupled to the third bridge 150 through connecting bus 146. Connecting bus 146 also couples the host bridge 130 to a peripheral component interconnect (PCI) bus 145, which may, in turn, be coupled to several PCI slots 105, at least one of which may be coupled to the combined mouse/telephone handset device 24 constructed in accordance with the present invention and which operates as described above with reference to FIGS. 1–4.

The third bridge 150 may also be coupled to at least one integrated drive electronics (IDE) port 154, and may also be coupled to at least one universal serial bus (USB) port 153. If a PCI connection is not used for the mouse part of mouse/telephone input a USB port 153 may be coupled to the combined mouse/telephone handset device 24 constructed in accordance with the present invention and which operates as described above with reference to FIGS. 1–4.

The third bridge 150 may also be coupled to an industry standard architecture (ISA) bus 152 which is also coupled to a system BIOS 151. The ISA bus 152 may also be coupled to several ISA slots 155, one of which may be coupled to the combined mouse/telephone handset device 24 constructed in accordance with the present invention and which operates as described above with reference to FIGS. 1–4, if the PCI or USB connections are not used.

While a preferred embodiment of the invention has been described and illustrated, it should be apparent that many modifications can be made to the invention without departing from its spirit or scope. Accordingly, the invention is not limited by the foregoing description or drawings, but is only limited by the scope of the appended claims.

What is claimed as new and desired to be protected by Letters Patent of the United States is:

1. A combined computer mouse and telephone device comprising:
   a computer mouse device;
   a telephone device; and
   a common housing for said mouse device and telephone device, said common housing being movable between an open condition and a closed condition and comprising a top-side housing portion and a bottom-side housing portion joined together by a hinge device which permits said top-side housing portion and bottom side housing portion to be in face-to-face contact when said common housing is in said closed condition and to permit said top-side housing to rotate about said hinge device relative to said bottom-side housing when said common housing is moved to said open condition.

2. The device of claim 1, wherein said telephone device includes an alphanumeric keypad which is not accessible when said common housing is in said closed condition.

3. The device of claim 2, wherein said keypad is mounted at said top-side housing portion and is accessible to a user when said common housing is open.

4. The device of claim 3, wherein said mouse device is mounted at said bottom-side housing portion and provides a track ball structure at an exterior surface of said bottom-side housing portion when said common housing is closed.

5. The device of claim 1, wherein said telephone device further includes a speaker and a microphone, said speaker being mounted at said top-side housing portion and said microphone being mounted at said bottom-side housing portion.

6. The device of claim 1 further comprising an electrical cord for said device containing a plurality of wires, a first set of said plurality of wires connecting to said mouse device, a second set of said plurality of wires connecting to said telephone device.

7. The device of claim 1, wherein said mouse device comprises at least one select switch provided on a surface of said top-side housing portion which is an exterior surface when said common housing is closed.

8. The device of claim 7 further comprising two select switches provided on said exterior surface.

9. The device of claim 1, wherein said mouse device further comprises a track ball structure provided at a surface of said bottom-side housing which is an exterior surface when said common housing is closed.

10. The device of claim 1, wherein said top-side housing portion comprises:
    a speaker;
    an alphanumeric keypad;
    an on-hook/off-hook switch provided at a surface of said top-side housing portion which is an interior surface when said common housing is closed; and
    a plurality of mouse pointer select buttons which are provided at a surface of said top-side housing portion which is an exterior surface when said common housing is closed.

11. The device of claim 10, wherein said speaker is located on the top-side housing portion at an end of said top-side housing portion which is opposite an end of said top-side housing portion connected with said hinge device.

12. The device of claim 11, wherein said on hook/off hook switch is located at said interior surface of said top-side housing portion at a point between said alphanumeric keypad and said hinge.

13. The device of claim 10, wherein said plurality of mouse pointer select buttons are located on an end of said top-side housing portion which is opposite an end of said top-side housing portion which is connected to said hinge.

14. The device of claim 1, wherein said bottom-side housing portion comprises:
    a track ball;
    a microphone; and
    a cord.

15. The device of claim 14, wherein said track ball is located in a central position within the bottom-side housing portion with said track ball projecting from a surface of said bottom-side housing portion which is an exterior surface when said common housing is in a closed condition.

16. The device of claim 14, wherein said microphone is located on a surface of said bottom-side housing portion which is an interior surface when said common housing is in a closed condition.

17. The device of claim 16, wherein said microphone is located at an end of said bottom-side housing portion which is opposite an end of said bottom-side housing portion which is connected to said hinge device.

18. The device of claim 14, wherein said cord contains a plurality of wires, a first set of said plurality of wires connecting to said mouse device, a second set of said plurality of wires connecting to said telephone device.

19. The device of claim 18, wherein said cord further comprises a common connector for said plurality of wires.

20. The device of claim 1, wherein said hinge device further operates as a hinge-switch which selectively controls enablement of said telephone device and said mouse device.

21. The device of claim 20, wherein the hinge-switch is activated upon moving said common housing from an open condition to a closed condition, or from a closed condition to an open condition.

22. The device of claim 21, wherein activating the hinge-switch toggles the device between a telephone mode of operation and a mouse mode of operation.

23. The device of claim 22, wherein toggling the device between its telephone mode of operation and its mouse mode of operation is achieved through an enabling circuit.

24. A processor-based system comprising:
    at least one processor; and
    a combined computer mouse and telephone device providing input signals to said at least one processor and comprising:
       a computer mouse device;
       a telephone device; and
       a common housing for said mouse device and telephone device said common housing being movable between an open condition and a closed condition and comprising a top-side housing portion and a bottom-side housing portion joined together by a hinge device which permits said top-side housing portion and bottom-side housing portion to be in face-to-face contact when said common housing is in said closed condition and to permit said top-side housing to rotate about said hinge device relative to said bottom-side housing when said common housing is moved to said open condition.

25. The system of claim 24, wherein said telephone device includes an alphanumeric keypad which is not accessible when said common housing is in said closed condition.

26. The system of claim 25, wherein said keypad is mounted at said top-side housing portion and is accessible to a user when said common housing is open.

27. The system of claim 26, wherein said mouse device is mounted at said bottom-side housing portion and provides a track ball structure at an exterior surface of said bottom-side housing portion when said common housing is closed.

28. The system of claim 24, wherein said telephone device further includes a speaker and a microphone, said speaker being mounted at said top-side housing portion and said microphone being mounted at said bottom-side housing portion.

29. The system of claim 24, wherein said mouse device comprises at least one select switch provided on a surface of said top-side housing portion which is an exterior surface when said common housing is closed.

30. The system of claim 29, wherein said mouse device further comprises a track bail structure provided at a surface of said bottom-side housing which is an exterior surface when said common housing is closed.

31. The system of claim 24, wherein said top-side housing portion comprises:
   a speaker;
   an alphanumeric keypad;
   an on-hook/off-hook switch provided at a surface of said top-side housing portion which is an interior surface when said common housing is closed; and
   a plurality of mouse pointer select buttons which are provided at a surface of said top-side housing portion which is an exterior surface when said common housing is closed.

32. The system of claim 31, wherein said speaker is located on the top-side housing portion at an end of said top-side housing portion which is opposite an end of said top-side housing portion connected with said hinge device.

33. The system of claim 24, wherein said bottom-side housing portion comprises:
   a track ball;
   a microphone; and
   a cord.

34. The system of claim 33, wherein said microphone is located on a surface of said bottom-side housing portion which is an interior surface when said common housing is in a closed condition.

35. The system of claim 24, wherein said hinge device further operates as a hinge-switch which selectively controls enablement of said telephone device and said mouse device.

36. The system of claim 35, wherein the hinge-switch is activated upon moving said common housing from an open condition to a closed condition, or from a closed condition to an open condition.

37. The system of claim 36, wherein activating the hinge-switch toggles the device between a telephone mode of operation and a mouse mode of operation.

38. The system of claim 24 further comprising at least one bridge, said bridge being coupled to said at least one processor.

39. The system of claim 38 further comprising memory capacity, said memory capacity being coupled to said at least one bridge.

40. The system of claim 39 further comprising a video monitor, said video monitor being coupled to said at least one bridge.

41. A computer mouse device comprising:
   a housing comprising a top-side housing portion and a bottom-side housing portion joined together by a hinge, the housing being movable between an open configuration and a closed configuration by movement of the housing portions with respect to one another about the hinge;
   a track ball and at least one pointer select button, the track ball and the pointer select button being carried by the housing and accessible from an exterior of the housing when the housing is in its closed condition; and
   a speaker and a microphone carried by the housing at a location wherein they are concealed in an interior of the housing when the housing is in its closed configuration, but are accessible to a user when the housing is in its open configuration.

42. The device of claim 41 wherein the speaker is carried by one of the housing portions and the microphone is carried by the other of said housing portions.

43. The device of claim 42 wherein the speaker is carried by the top-side housing portion and the microphone is carried by the bottom-side housing portion.

44. The device of claim 43 wherein the speaker and the microphone are both spaced away from the hinge.

45. The device of claim 44 wherein the speaker is located on an interior surface of the top-side housing portion adjacent a first end thereof, the first end being opposite a second end of the top-side housing portion connected to the hinge.

46. The device of claim 41 further comprising a keypad carried by the housing at a location which is concealed in the interior of the housing when the housing is in its closed configuration but is accessible to the user when the housing is in its open configuration.

47. A combined computer mouse and telephone handset comprising:
   a housing comprising first and second housing portions joined together by a hinge, the housing being movable between an open configuration and a closed configuration by movement of the housing portions with respect to one another about the hinge;
   a mouse device comprising a track ball and at least one pointer select button, the track ball and the pointer select button being carried by the housing and accessible from an exterior of the housing when the housing is in its closed condition; and
   a telephone handset comprising a speaker carried by the first housing portion at a location spaced from the hinge and a microphone carried by the second housing portion at a location spaced from the hinge, the speaker and the microphone being concealed in an interior of the housing when the housing is in its closed configuration, but being accessible to a user when the housing is in its open configuration; and
   a cord for connecting at least the mouse device to a computer, the cord being attached to the second housing portion.

48. The device of claim 47 wherein the telephone handset further comprises a keypad which is carried by one of the housing portions, the keypad being concealed in the interior of the housing when the housing is in its closed configuration, but being accessible to a user when the housing is in its open configuration.

49. The device of claim 48 wherein the keypad is carried by the first housing portion.

50. The device of claim 47 further comprising a switch carried by the housing and operatively associated with the telephone handset to terminate communication via the telephone handset when the housing is moved from its open configuration to its closed configuration.

51. The device of claim 48 wherein the first housing portion is a top-side housing portion and the second housing portion is a bottom-side housing portion, the bottom-side housing portion being positioned beneath the top-side housing portion when the housing is in its closed configuration for use as a mouse.

* * * * *

UNITED STATES PATENT AND TRADEMARK OFFICE
CERTIFICATE OF CORRECTION

PATENT NO.     : 6,285,354 B1
DATED          : September 4, 2001
INVENTOR(S)    : Revis It is certified that error appears in the above-identified patent and that said Letters Patent is hereby corrected as shown below:

Column 3,
Line 14, "on hook" should be -- on-hook --;
Lines 16-17, "on hook" should be -- on-hook --;

Column 5,
Line 54, "dosed" should be -- closed --;

Column 7,
Line 27, "bail" should be -- ball --;

Column 9,
Line 5, "47" should be -- 49 --;

Signed and Sealed this

Eighth Day of October, 2002

Attest:

JAMES E. ROGAN
Attesting Officer                Director of the United States Patent and Trademark Office